United States Patent [19]
Zimmerman

[11] 3,741,395
[45] June 26, 1973

[54] DISPOSABLE HUMAN BLOOD DIALYSIS DEVICE

[75] Inventor: Lester Zimmerman, Hicksville, N.Y.

[73] Assignee: Vernitron Medical Products, Inc., Great Neck, N.Y.

[22] Filed: Mar. 11, 1971

[21] Appl. No.: 123,232

[52] U.S. Cl. .................................. 210/321, 210/494
[51] Int. Cl. ............................................ B01d 31/00
[58] Field of Search ...................... 210/22, 321, 494

[56] References Cited
UNITED STATES PATENTS

| | | | |
|---|---|---|---|
| 3,508,662 | 4/1970 | Miller | 210/494 X |
| 3,650,404 | 3/1972 | Versaci | 210/321 X |
| 3,077,268 | 2/1963 | Gobel et al. | 210/494 X |

Primary Examiner—Frank A. Spear, Jr.
Attorney—Edward H. Loveman, Esq.

[57] ABSTRACT

A dialysis device for handling human blood in an artificial kidney system using an improved interleaved, wrapped arrangement of the tubular blood-filtering membrane and its supporting mesh which cooperate to provide the filtering body thereof, wherein the membrane inlet and outlet are confined against rupturing movement and the helical wrap of the membrane is supported by the mesh without a severe change in direction, thereby minimizing the introduction of a flow resistance force that can not be readily controlled.

7 Claims, 5 Drawing Figures

PATENTED JUN 26 1973 3,741,395

INVENTOR
LESTER ZIMMERMAN

*Bauer & Amer*
ATTORNEYS

DISPOSABLE HUMAN BLOOD DIALYSIS DEVICE

The present invention relates generally to devices for dialysis or ultrafiltration, and specifically to an improved dialysis device for human blood purification in an artificial kidney system.

The dialysis device hereof is of the type used in artificial kidney systems wherein the fluid contents of human blood are separated by a permeable membrane, some of these fluid contents consisting of exogenous or endogenous poisons, or the like, passing through the membrane and being flushed away by a dialyzing fluid. The actual filtering construction or body thereof, consisting of an interleaved, wrapped arrangement of the membrane, in tubular form, and of its supporting mesh, is already well known according to U. S. Pat. No. 3,508,662 issued on Apr. 28, 1970 and other prior patents cited therein. While this general construction in a filtering body is generally satisfactory for use in a dialysis device, it has the serious shortcoming, at least as used in the mentioned patents, of requiring a severe directional change in the helically wrapped tubular membrane. This, in turn, imposes a restrictive force on the blood flow through the membrane which is not of a precisely known extent or magnitude and which is, therefore, not readily subject to control.

Broadly, it is an object of the present invention to provide an improved artificial kidney system dialysis device overcoming the foregoing and other shortcomings of the prior art. Specifically, it is an object to provide a filtering body construction for a human blood dialysis device having a uniform, predictable flow resistance characteristic, due primarily to the avoidance of severe changes in direction in the helically wrapped tubular membrane.

A filtering body for a human blood dialysis device demonstrating objects and advantages of the present invention includes, as a noteworthy structural addition to the known helically wrapped arrangement of membrane and supporting mesh, the use of a mounting cavity for the membrane outlet advantageously located adjacent the body outer wrap, said cavity being bounded by walls extending inwardly of the body to a prescribed depth. Thus, the outflowing blood merely proceeds generally in a continuous, uninterrupted fashion, rather than being forced through the prior art arrangement of the membrane in which it is threaded back through the body so it can be supported on a rigid inner core of the body.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 4:
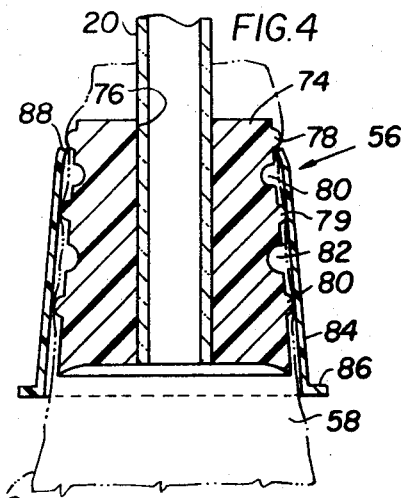
Figure 5:
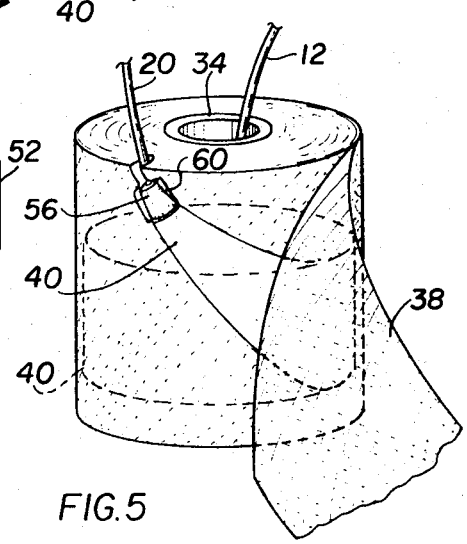

FIG. 4 is an isolated side elevational view of the outlet fluid connection hereof, which is in section to better illustrate structural features thereof; and FIG. 5 is a perspective view of the filtering body in which the outer wrap of the supporting mesh thereof is shown removed from the body proper in order to illustrate the manner in which the outlet fluid connection is supported within an accommodating recessed cavity formed in said filtering body.

Figure 1:
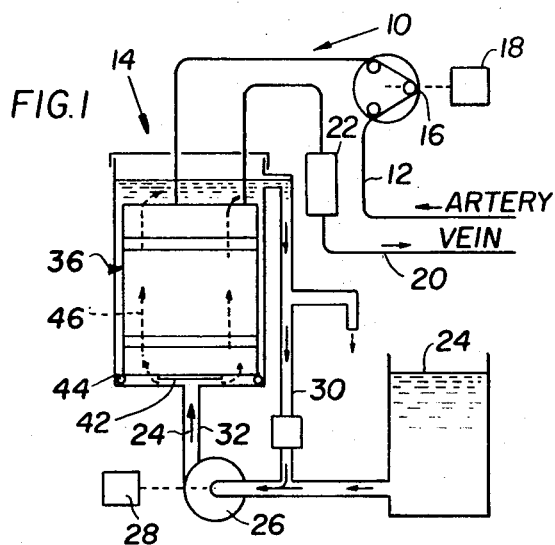
FIG. 1 is a simplified diagramatic view of an exemplary artificial kidney system including the improved disposable filtering device hereof.

Reference is now made to the drawings and in particular to FIG. 1 illustrating an exemplary artificial kidney system, generally designated 10. It will be understood that system 10 is of the type utilized for human blood dialysis or ultrafiltration and, to this end, includes an inlet conduit 12 having a fluid communication via an appropriate connection to the patient's artery for the purpose of passing the patient's blood through the dialysis or filtering device hereof, generally designated 14. Specifically, a so-called "finger" or other such appropriate pump 16 powered by an electric motor 18 is operatively arranged in the inlet conduit 12 so as to force the blood through the dialysis device 14 preparatory to the removal therefrom of exogenous or endogenous poisons. The purified or processed blood is then returned via the return or outlet conduit 20 to the circulatory system of the patient, passing in the process through the collection chamber 22 to exhaust any entrapped bubbles from the processed blood.

As is generally understood, the dialysis or ultrafiltration process which occurs within the dialysis device 14 contemplates the flowing of the human blood, which has been removed from the patient, through a permeable membrane wherein the previously noted poisonous fluid contents thereof flows through the membrane and is carried away by a dialyzing fluid passing in flushing relation with the permeable membrane, all as will be explained subsequently herein. It is convenient at this point to note that the dialyzing fluid is recirculated between a source of supply in a sump 24 and the dialysis device 14 by a pump 26 operated by a motor 28 via the conduit connections 30 and 32.

Figure 3:
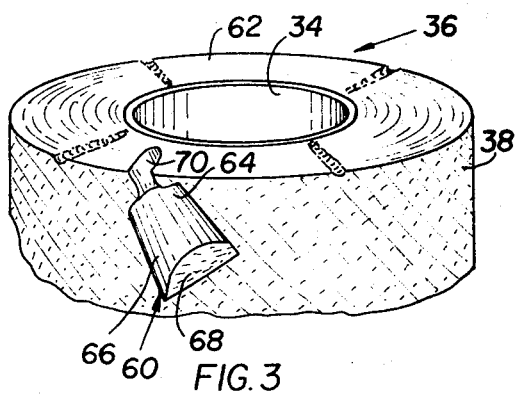
FIG. 3 is a partial perspective view of the filtering body of the filtering device hereof illustrating the recessed cavity for accommodating the outlet fluid connection thereof.
Figure 2:
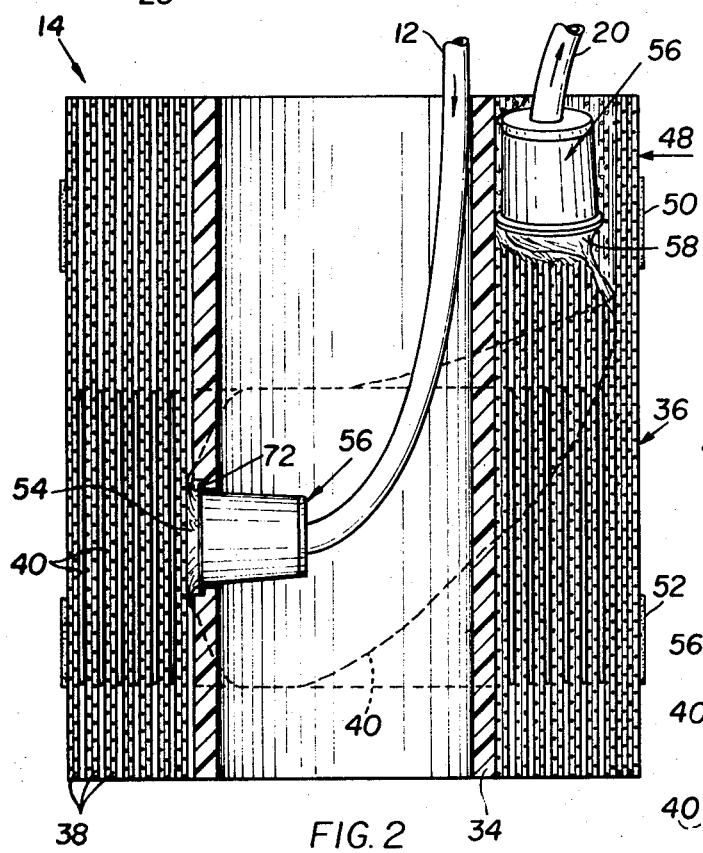
FIG. 2 is an isolated side elevational view of the filtering device, on an enlarged scale and in section to better illustrate internal structural features thereof.

What has been described thus far is well known in the prior art. In fact, the filtering body, as shown in FIGS. 2, 3 and 5 is also of a generally well known type, although it should be understood that it includes, in addition, structural features which are not known and which constitutes a patentable advance over what is known. The aspects of the device 14 which are known are its general construction which will now be described. This consists of an inner rigid plastic core 34 which supports and has in wrapped relation about it a filtering body, generally designated 36, which is formed as a helically wrapped, interleaved arrangement of a supporting mesh 38 (see in particular FIG. 5) and an elongated tubular blood-filtering membrane 40 having an operative supported position, as illustrated in FIG. 2, on the rigid support core 34. The tubular membrane 40 is readily available and, in a well understood manner, functions during operation of the dialysis device 14 to separate that portion of the fluid contents of the human blood consisting of exogenous or endogenous poisons. Specifically, as generally understood, the blood is forced through the helical turns of the elongated tubular membrane 40 during which only the poisonous fluid contents thereof are capable of and thereby pass through its permeable walls. The dialyzing or flushing fluid, which may consist of water, is pumped through the previously noted inlet 32 against the bottom surface of the unit 14. As best shown in FIG. 1, the dialyzing fluid 24 initially strikes a closure 42 in the bottom opening of the support core 34 and is consequently displaced to either side of this closure and is prevented from bypassing the filtering body 36 by a sealing ring 44 on which the filtering body 36 is firmly seated. Thus, the dialyzing fluid 24 is forced along the flow path designated 46 in FIG. 1 through the spaces between the helical wraps of the support mesh 38 and thus in flushing relation with the tubular membrane 40 which is interleaved between the wraps of supporting mesh 38. In this manner, the poisons that are passed through the permeable walls of the tubular blood-filtering membrane 40 are carried to a remote location in accordance with well known techniques in the operation of the artificial kidney system 10.

During the foregoing process, a known amount of external pressure is applied against the tubular blood-filtering membrane 40 by any one of several techniques in order to introduce a known resistance force to blood flowing through the tubular membrane 40. The applied force has significant effect on the dialyzing capability of the tubular membrane 40. In the illustrated example hereof, this external force 48, which as clearly illustrated in FIG. 2 is applied circumferentially upon the filtering body 36, is achieved by force fitting the filtering body 36, consisting of a select number of helical turns of supporting mesh, within retaining rings 50 and 52 of a select diameter which provides the extent of external pressure 48 which is desired. Alternatively, the filtering body 36 can be disposed within and thereby subjected to any select amount of pressure applied by an inflatable cuff.

In accordance with the present invention, severe changes in direction of the elongated tubular membrane 40 are minimized since these changes in direction introduce resistance to flow through the membrane which are not subject to accurate control. The avoidance of these severe changes in direction is achieved as follows. The tubular membrane 40, as best illustrated in FIG. 2, has at one end a length portion bounding an inlet opening, generally designated 54, which is connected via a fluid connection, generally designated 56, to the previously noted inlet conduit 12. At its opposite end, the tubular membrane 40 terminates in a length portion which bounds an outlet opening, generally designated 58, which communicates via a similarly constructed fluid connection, which is also herein designated 56, to the outlet conduit 20.

Before describing in detail the structural features of the similarly constructed inlet and outlet fluid connections 56, a significant and noteworthy structural feature of the filtering body 36 should be noted which contributes to the avoidance of severe directional changes in the helically arranged tubular blood-filtering membrane 40. This structural feature, as best illustrated in FIGS. 3 and 5, consists of a recessed cavity, generally designated 60, which is sized to accommodate the outlet fluid connection 56. Cavity 60 is advantageously located adjacent the upper end 62 of the filtering body 36 and consists of converging curved side walls 64 and 66 which extend from the outer wrap inwardly of the filtering body 36 in the direction of the rigid core 34, and a third cooperating substantially flat side wall 68 which functions as a seat for the outlet fluid connection 56. A smaller cavity 70, sized to accommodate the outlet conduit 20, extends from the upper end of cavity 60. In practice, as illustrated in FIG. 5, the outlet fluid connection 56 of the tubular membrane 40 is thus able to be fixedly located adjacent the outer wrap of the filtering body 36 rather than being required to undergo a severe directional change as would be required if it had to be extended from the outer wrap back to the inner rigid core 34 for mounting on the rigid core 34.

From the foregoing, it should be readily appreciated that in addition to avoidance of any severe directional change in the tubular membrane 40 that the use of the cavity 60 in the advantageous location in the filtering body 36 as just described also results in structure which in cooperation with a counterbore 72 (see FIG. 2), which in an obvious manner fixedly mounts the inlet connection 56 to the rigid core 34, provides fixed locations for the respective inlet and outlet ends of the tubular membrane 40. This is significant since any movement in these ends, due for example to pressure applied against the membrane 40 by the dialyzing fluid passing in flushing contact with it, could result in a rupturing of the membrane and thus loss of human blood flowing through the membrane.

Reference is now made to FIG. 4 in which there is shown, on an enlarged scale to better illustrate the structural features, the outlet fluid connection 56. As noted, this fluid connection is similar in construction to the inlet fluid connection 56 and therefore the description of one such fluid connection, as illustrated in FIG. 4, will suffice for the purpose of conveying a complete understanding of the present invention. The illustrated fluid connection 56 includes an inner plug 74, preferrably cylindrical in cross section, having an inner through bore 76 sized to accommodate in a force fit an end of the outlet conduit 20. The outer cylindrical surface of the plug 74 is appropriately machined or molded with a series of three alternate radial projections 78–80 and concentric grooves 82. Completing each fluid connection 56 is an outer conical sleeve 84 having an inner diameter of an appropriate size providing a force fit of the sleeve 84 upon the inner plug 74. Sleeve 84 also preferrably has a radial flange 86 which, as part of the outlet connection, helps seat this connection on the flat side wall 68 and, as part of the inlet connection, seats in the counterbore 72 to effectively hold the inlet connection in mounting position on the rigid inner core 34.

The assembly of the outlet fluid connection 56 to the tubular membrane 40 includes disposing the inner plug 74 within the outlet opening 58 and then force fitting the outer sleeve 84 on the inner plug 74 while maintaining the length of the tubular membrane 40 bounding the outlet opening 58 in its interposed position between the inner plug 74 and outer sleeve 84. Additionally, the smaller open end 88 of sleeve 84 will be understood to be sized so that it is slightly smaller than radial ridge 78 adjacent one end of the inner plug 74 to an extent where the end opening 88 thereof slips over and then snaps behind the projection or ridge 78. This, in an obvious manner, contributes to holding sleeve 84 in position about the plug 74. The outer ridges 79 and 80 serve, in an obvious manner, as fluid seals preventing any leakage of the human blood between the sealing members 74 and 84.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. A human blood filtering device comprising a support core, a filtering body formed as a helically wrapped, interleaved arrangement of a supporting mesh and of an elongated tubular blood-filtering membrane having an operative supported position on said support core, said tubular blood-filtering membrane having an inlet opening adjacent the innermost wrap of said filtering body, a blood inlet conduit means having a fluid connection to said membrane inlet opening and operatively fixedly mounted on said support core to minimize any rupturing movement in said fluid connection, a blood outlet conduit means having a fluid connection to said membrane outlet opening, and means to restrain said last named fluid connection against any rupturing movement consisting of a recessed cavity formed in said filtering body, said cavity being bounded by plural walls extending inwardly from said filtering body outermost wrap to a prescribed depth in the direction of said support core, whereby there is an optimum minimum restriction to blood flow through said blood-filtering membrane due to changes in flow direction therethrough.

2. A human blood filtering device as claimed in claim 1 wherein each said fluid connection comprises an inner plug member having an operative position force fit within an outer sleeve member, and the portion of said blood-filtering membrane bounding said outlet and inlet openings thereof in sealed position interposed between said inner plug and said outer sleeve.

3. A human blood-filtering device as claimed in claim 2 wherein said inner plug is cylindrical in cross section and has plural concentric ridges spaced between the ends thereof, said ridge adjacent one said end serving as a seat for holding said outer sleeve member in position and said other ridges serving as fluid seals.

4. A human blood filtering device comprising a support core, a filtering body formed in a cylindrical shape with opposite first and second operative ends of a helically wrapped, interleaved arrangement of a supporting mesh and of an elongated tubular blood-filtering membrane having an operative supported position on said support mesh and of an elongated tubular blood-filtering membrane having an operative supported position on said support core, said tubular blood-filtering membrane having an inlet opening located adjacent said filtering body first operative end and also adjacent said support core and an outlet opening located adjacent said filtering body second operative end and also adjacent the outermost wrap of said filtering body, a blood inlet conduit means having a fluid connection to said membrane inlet opening and operatively fixedly mounted on said support core to minimize any rupturing movement in said fluid connection, a blood outlet conduit means having a fluid connection to said membrane outlet opening, and means to restrain said last named fluid connection against any rupturing movement consisting of a recessed cavity formed in said filtering body adjacent said second operative end thereof, said cavity being bounded by plural walls extending inwardly from said filtering body outermost wrap to a prescribed depth in the direction of said support core, whereby there is an optimum minimum restriction to blood flow through said blood-filtering membrane due to changes in flow direction therethrough.

5. A human blood-filtering device as claimed in claim 4 wherein the helical turns of said blood-filtering membrane are located adjacent said filtering body first operative end except for the last helical turn thereof which contains said outlet opening, said last helical turn being threaded from said filtering body first operative end to said second operative end thereof.

6. A human blood-filtering device as claimed in claim 4 wherein each said fluid connection comprises an inner plug member having an operative position force fit within an outer sleeve member, and the portion interposed between said inner plug and said outer sleeve.

7. A human blood-filtering device as claimed in claim 6 wherein said inner plug is cylindrical in cross section and has plural concentric ridges spaced between the ends thereof, said ridge adjacent one said end serving as a seat for holding said outer sleeve member in position and said other ridges serving as fluid seals.

* * * * *